(12) United States Patent
Matthews

(10) Patent No.: US 10,337,441 B2
(45) Date of Patent: Jul. 2, 2019

(54) AIR PER CYLINDER DETERMINATION SYSTEMS AND METHODS

(71) Applicant: GM Global Technology Operations LLC, Detroit, MI (US)

(72) Inventor: Gregory P. Matthews, West Bloomfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 961 days.

(21) Appl. No.: 14/734,619

(22) Filed: Jun. 9, 2015

(65) Prior Publication Data

US 2016/0363083 A1 Dec. 15, 2016

(51) Int. Cl.
| | | |
|---|---|---|
| F02D 17/02 | (2006.01) | |
| F02D 41/18 | (2006.01) | |
| F02D 41/30 | (2006.01) | |
| F02D 41/00 | (2006.01) | |

(Continued)

(52) U.S. Cl.
CPC ......... F02D 41/30 (2013.01); F02D 41/0002 (2013.01); F02D 41/0085 (2013.01); F02D 41/0087 (2013.01); F02D 41/18 (2013.01); F02D 41/2438 (2013.01); F02D 41/2454 (2013.01); F02D 41/2461 (2013.01); F02D 41/34 (2013.01); F02D 17/02 (2013.01); F02D 2041/001 (2013.01); F02D 2200/0406 (2013.01); F02D 2200/0411 (2013.01);

(Continued)

(58) Field of Classification Search
CPC ............... F02D 41/008; F02D 41/0082; F02D 41/0085; F02D 41/0087; F02D 2041/0012; F02D 13/06; Y02T 10/42

USPC .................................................. 701/103, 106
See application file for complete search history.

(56) References Cited

U.S. PATENT DOCUMENTS

| | | | |
|---|---|---|---|
| 3,596,640 | A | 8/1971 | Bloomfield |
| 4,129,034 | A | 12/1978 | Niles et al. |
| 4,172,434 | A | 10/1979 | Coles |

(Continued)

FOREIGN PATENT DOCUMENTS

| | | |
|---|---|---|
| CN | 1573916 A | 2/2005 |
| CN | 1888407 A | 1/2007 |

(Continued)

OTHER PUBLICATIONS

International Search Report and Written Opinion dated Jun. 17, 2015 corresponding to International Application No. PCT/US2015/019496, 14 pages.

(Continued)

*Primary Examiner* — Jacob M Amick
*Assistant Examiner* — Michael A Kessler

(57) ABSTRACT

An engine control system of a vehicle includes a cylinder control module a first air per cylinder (APC) module, an adjustment module, and a fuel control module. The cylinder control module determines a target fraction of activated cylinders of an engine. The first APC module determines a first APC value based on an intake manifold pressure and an air temperature. The adjustment module determines an APC adjustment value based on the target fraction of activated cylinders. The first APC module also determines a second APC value based on the first APC value and the APC adjustment value. The fuel control module controls fuel injection based on the second APC value and a target air/fuel mixture.

14 Claims, 5 Drawing Sheets

(51) Int. Cl.
  *F02D 41/24* (2006.01)
  *F02D 41/34* (2006.01)
(52) U.S. Cl.
  CPC ....... *F02D 2200/0414* (2013.01); *Y02T 10/42* (2013.01); *Y02T 10/44* (2013.01)

(56) References Cited

U.S. PATENT DOCUMENTS

| | | | |
|---|---|---|---|
| 4,377,997 A | 3/1983 | Staerzl | |
| 4,434,767 A | 3/1984 | Kohama et al. | |
| 4,489,695 A | 12/1984 | Kohama et al. | |
| 4,509,488 A | 4/1985 | Forster et al. | |
| 4,535,744 A | 8/1985 | Matsumura | |
| 4,770,148 A | 9/1988 | Hibino et al. | |
| 4,887,216 A | 12/1989 | Ohnari et al. | |
| 4,974,563 A | 12/1990 | Ikeda et al. | |
| 4,987,888 A | 1/1991 | Funabashi et al. | |
| 5,042,444 A | 8/1991 | Hayes et al. | |
| 5,094,213 A | 3/1992 | Dudek et al. | |
| 5,226,513 A | 7/1993 | Shibayama | |
| 5,278,760 A | 1/1994 | Ribbens et al. | |
| 5,357,932 A | 10/1994 | Clinton et al. | |
| 5,374,224 A | 12/1994 | Huffmaster et al. | |
| 5,377,631 A | 1/1995 | Schechter | |
| 5,423,208 A * | 6/1995 | Dudek | F02D 41/045 123/478 |
| 5,465,617 A | 11/1995 | Dudek et al. | |
| 5,496,227 A | 3/1996 | Minowa et al. | |
| 5,540,633 A | 7/1996 | Yamanaka et al. | |
| 5,553,575 A | 9/1996 | Beck et al. | |
| 5,584,266 A | 12/1996 | Motose et al. | |
| 5,669,354 A | 9/1997 | Morris | |
| 5,692,471 A | 12/1997 | Zhang | |
| 5,720,257 A | 2/1998 | Motose et al. | |
| 5,778,858 A | 7/1998 | Garabedian | |
| 5,813,383 A | 9/1998 | Cummings | |
| 5,826,563 A | 10/1998 | Patel et al. | |
| 5,884,605 A | 3/1999 | Nagaishi et al. | |
| 5,909,720 A | 6/1999 | Yamaoka et al. | |
| 5,931,140 A | 8/1999 | Maloney | |
| 5,934,263 A | 8/1999 | Russ et al. | |
| 5,941,927 A | 8/1999 | Pfitz | |
| 5,974,870 A | 11/1999 | Treinies et al. | |
| 5,975,052 A | 11/1999 | Moyer | |
| 5,983,867 A | 11/1999 | Stuber et al. | |
| 6,125,812 A | 10/2000 | Garabedian | |
| 6,158,411 A | 12/2000 | Morikawa | |
| 6,244,242 B1 | 6/2001 | Grizzle et al. | |
| 6,247,449 B1 | 6/2001 | Persson | |
| 6,272,427 B1 | 8/2001 | Wild et al. | |
| 6,286,366 B1 | 9/2001 | Chen et al. | |
| 6,295,500 B1 | 9/2001 | Cullen et al. | |
| 6,332,446 B1 | 12/2001 | Matsumoto et al. | |
| 6,334,425 B1 | 1/2002 | Nagatani et al. | |
| 6,355,986 B1 | 3/2002 | Kato et al. | |
| 6,360,724 B1 | 3/2002 | Suhre et al. | |
| 6,363,316 B1 | 3/2002 | Soliman et al. | |
| 6,371,075 B2 | 4/2002 | Koch | |
| 6,385,521 B1 | 5/2002 | Ito | |
| 6,408,625 B1 | 6/2002 | Woon et al. | |
| 6,520,140 B2 | 2/2003 | Dreymuller et al. | |
| 6,546,912 B2 | 4/2003 | Tuken | |
| 6,588,261 B1 | 7/2003 | Wild et al. | |
| 6,619,258 B2 | 9/2003 | McKay et al. | |
| 6,622,548 B1 | 9/2003 | Hernandez | |
| 6,694,806 B2 | 2/2004 | Kumagai et al. | |
| 6,738,707 B2 | 5/2004 | Kotwicki et al. | |
| 6,754,577 B2 | 6/2004 | Gross et al. | |
| 6,760,656 B2 | 7/2004 | Matthews et al. | |
| 6,850,831 B2 | 2/2005 | Buckland et al. | |
| 6,909,961 B2 | 6/2005 | Wild et al. | |
| 6,978,204 B2 | 12/2005 | Surnilla et al. | |
| 6,980,902 B2 | 12/2005 | Nakazawa | |
| 6,981,492 B2 | 1/2006 | Barba et al. | |
| 6,983,737 B2 | 1/2006 | Gross et al. | |
| 7,003,390 B2 | 2/2006 | Kaga | |
| 7,024,301 B1 | 4/2006 | Kar et al. | |
| 7,025,041 B2 | 4/2006 | Abe et al. | |
| 7,028,661 B1 | 4/2006 | Bonne et al. | |
| 7,032,545 B2 | 4/2006 | Lewis et al. | |
| 7,032,581 B2 | 4/2006 | Gibson et al. | |
| 7,044,101 B1 | 5/2006 | Duty et al. | |
| 7,063,062 B2 | 6/2006 | Lewis et al. | |
| 7,066,121 B2 | 6/2006 | Michelini et al. | |
| 7,066,136 B2 | 6/2006 | Ogiso | |
| 7,069,718 B2 | 7/2006 | Surnilla et al. | |
| 7,069,773 B2 | 7/2006 | Stempnik et al. | |
| 7,086,386 B2 | 8/2006 | Doering | |
| 7,100,720 B2 | 9/2006 | Ishikawa | |
| 7,111,612 B2 | 9/2006 | Michelini et al. | |
| 7,140,355 B2 | 11/2006 | Michelini et al. | |
| 7,159,568 B1 | 1/2007 | Lewis et al. | |
| 7,174,713 B2 | 2/2007 | Nitzke et al. | |
| 7,174,879 B1 | 2/2007 | Chol et al. | |
| 7,200,486 B2 | 4/2007 | Tanaka et al. | |
| 7,203,588 B2 | 4/2007 | Kaneko et al. | |
| 7,231,907 B2 | 6/2007 | Bolander et al. | |
| 7,278,391 B1 | 10/2007 | Wong et al. | |
| 7,292,231 B2 | 11/2007 | Kodama et al. | |
| 7,292,931 B2 * | 11/2007 | Davis | F02D 41/18 701/102 |
| 7,319,929 B1 | 1/2008 | Davis et al. | |
| 7,363,111 B2 | 4/2008 | Vian et al. | |
| 7,367,318 B2 | 5/2008 | Moriya et al. | |
| 7,415,345 B2 | 8/2008 | Wild | |
| 7,440,838 B2 * | 10/2008 | Livshiz | F02D 41/18 123/349 |
| 7,464,676 B2 * | 12/2008 | Wiggins | F01L 1/344 123/90.15 |
| 7,472,014 B1 | 12/2008 | Albertson et al. | |
| 7,497,074 B2 | 3/2009 | Surnilla et al. | |
| 7,499,791 B2 | 3/2009 | You et al. | |
| 7,503,312 B2 | 3/2009 | Surnilla et al. | |
| 7,509,201 B2 | 3/2009 | Bolander et al. | |
| 7,555,896 B2 | 7/2009 | Lewis et al. | |
| 7,577,511 B1 | 8/2009 | Tripathi et al. | |
| 7,581,531 B2 | 9/2009 | Schulz | |
| 7,614,384 B2 | 11/2009 | Livshiz et al. | |
| 7,620,188 B2 | 11/2009 | Inoue et al. | |
| 7,621,262 B2 | 11/2009 | Zubeck | |
| 7,634,349 B2 | 12/2009 | Senft et al. | |
| 7,685,976 B2 | 3/2010 | Marriott | |
| 7,785,230 B2 | 8/2010 | Gibson et al. | |
| 7,836,866 B2 | 11/2010 | Luken et al. | |
| 7,849,835 B2 | 12/2010 | Tripathi et al. | |
| 7,886,715 B2 | 2/2011 | Tripathi et al. | |
| 7,930,087 B2 | 4/2011 | Gibson et al. | |
| 7,946,263 B2 | 5/2011 | O'Neill et al. | |
| 7,954,474 B2 | 6/2011 | Tripathi et al. | |
| 8,050,841 B2 | 11/2011 | Costin et al. | |
| 8,099,224 B2 | 1/2012 | Tripathi et al. | |
| 8,108,132 B2 | 1/2012 | Reinke | |
| 8,131,445 B2 | 3/2012 | Tripathi et al. | |
| 8,131,447 B2 | 3/2012 | Tripathi et al. | |
| 8,135,410 B2 | 3/2012 | Forte | |
| 8,145,410 B2 | 3/2012 | Berger et al. | |
| 8,146,565 B2 | 4/2012 | Leone et al. | |
| 8,272,367 B2 | 9/2012 | Shikama et al. | |
| 8,347,856 B2 | 1/2013 | Leone et al. | |
| 8,402,942 B2 | 3/2013 | Tripathi et al. | |
| 8,473,179 B2 | 6/2013 | Whitney et al. | |
| 8,616,181 B2 | 12/2013 | Sahandiesfanjani et al. | |
| 8,646,430 B2 | 2/2014 | Kinoshita | |
| 8,646,435 B2 | 2/2014 | Dibble et al. | |
| 8,701,628 B2 | 4/2014 | Tripathi et al. | |
| 8,706,383 B2 | 4/2014 | Sauve et al. | |
| 8,833,058 B2 | 9/2014 | Ervin et al. | |
| 8,833,345 B2 | 9/2014 | Pochner et al. | |
| 8,869,773 B2 | 10/2014 | Tripathi et al. | |
| 8,979,708 B2 | 3/2015 | Burtch | |
| 9,020,735 B2 | 4/2015 | Tripathi et al. | |
| 9,140,622 B2 | 9/2015 | Beikmann | |
| 9,200,575 B2 | 12/2015 | Shost | |
| 9,212,610 B2 | 12/2015 | Chen et al. | |

(56) References Cited

U.S. PATENT DOCUMENTS

| | | |
|---|---|---|
| 9,222,427 B2 | 12/2015 | Matthews et al. |
| 9,228,519 B2 | 1/2016 | Hagari |
| 2001/0007964 A1 | 7/2001 | Poljansek et al. |
| 2002/0038654 A1 | 4/2002 | Sasaki et al. |
| 2002/0039950 A1 | 4/2002 | Graf et al. |
| 2002/0148439 A1 | 10/2002 | Kawasaki |
| 2002/0156568 A1 | 10/2002 | Knott et al. |
| 2002/0162540 A1 | 11/2002 | Matthews et al. |
| 2002/0189574 A1 | 12/2002 | Kim |
| 2003/0101961 A1 | 6/2003 | Foster |
| 2003/0116130 A1 | 6/2003 | Kisaka et al. |
| 2003/0123467 A1 | 7/2003 | Du et al. |
| 2003/0131820 A1 | 7/2003 | Mckay et al. |
| 2003/0172892 A1 | 9/2003 | Glugla et al. |
| 2003/0172900 A1 | 9/2003 | Boyer et al. |
| 2003/0217877 A1 | 11/2003 | Tatara et al. |
| 2003/0236599 A1 | 12/2003 | Saito et al. |
| 2004/0007211 A1 | 1/2004 | Kobayashi |
| 2004/0034460 A1 | 2/2004 | Folkerts et al. |
| 2004/0069290 A1 | 4/2004 | Bucktron et al. |
| 2004/0122584 A1 | 6/2004 | Muto et al. |
| 2004/0129249 A1 | 7/2004 | Kondo |
| 2004/0138027 A1 | 7/2004 | Rustige et al. |
| 2004/0206072 A1 | 10/2004 | Surnilla et al. |
| 2004/0258251 A1 | 12/2004 | Inoue et al. |
| 2005/0016492 A1 | 1/2005 | Matthews |
| 2005/0056250 A1 | 3/2005 | Stroh |
| 2005/0098156 A1 | 5/2005 | Ohtani |
| 2005/0131618 A1 | 6/2005 | Megli et al. |
| 2005/0197761 A1* | 9/2005 | Bidner .............. F02P 5/045 701/105 |
| 2005/0199220 A1 | 9/2005 | Ogiso |
| 2005/0204726 A1 | 9/2005 | Lewis |
| 2005/0204727 A1 | 9/2005 | Lewis et al. |
| 2005/0205028 A1 | 9/2005 | Lewis et al. |
| 2005/0205045 A1 | 9/2005 | Michelini et al. |
| 2005/0205060 A1 | 9/2005 | Michelini et al. |
| 2005/0205063 A1 | 9/2005 | Kolmanovsky et al. |
| 2005/0205069 A1 | 9/2005 | Lewis et al. |
| 2005/0205074 A1 | 9/2005 | Gibson et al. |
| 2005/0235743 A1 | 10/2005 | Stempnik et al. |
| 2006/0107919 A1 | 5/2006 | Nishi et al. |
| 2006/0112918 A1 | 6/2006 | Persson |
| 2006/0130814 A1 | 6/2006 | Bolander et al. |
| 2006/0178802 A1 | 8/2006 | Bolander et al. |
| 2007/0012040 A1 | 1/2007 | Nitzke et al. |
| 2007/0042861 A1 | 2/2007 | Takaoka et al. |
| 2007/0051351 A1 | 3/2007 | Pallett et al. |
| 2007/0100534 A1 | 5/2007 | Katsumata |
| 2007/0101969 A1 | 5/2007 | Lay et al. |
| 2007/0107692 A1 | 5/2007 | Kuo et al. |
| 2007/0131169 A1 | 6/2007 | Ahn |
| 2007/0131196 A1 | 6/2007 | Gibson et al. |
| 2007/0135988 A1 | 6/2007 | Kidston et al. |
| 2007/0234982 A1 | 10/2007 | Kolmanovsky et al. |
| 2007/0234984 A1 | 10/2007 | Kolmanovsky et al. |
| 2007/0235005 A1 | 10/2007 | Lewis |
| 2008/0000149 A1 | 1/2008 | Aradi |
| 2008/0041327 A1 | 2/2008 | Lewis et al. |
| 2008/0066699 A1 | 3/2008 | Michelini et al. |
| 2008/0098969 A1 | 5/2008 | Reed et al. |
| 2008/0109151 A1 | 5/2008 | Jaros et al. |
| 2008/0121211 A1 | 5/2008 | Livshiz et al. |
| 2008/0154468 A1 | 6/2008 | Berger et al. |
| 2008/0254926 A1 | 10/2008 | Schuseil et al. |
| 2008/0262698 A1 | 10/2008 | Lahti et al. |
| 2008/0288146 A1 | 11/2008 | Beechie et al. |
| 2009/0007877 A1 | 1/2009 | Raiford |
| 2009/0012665 A1* | 1/2009 | Brennan .............. B60L 1/003 701/22 |
| 2009/0013667 A1 | 1/2009 | Winstead |
| 2009/0013668 A1 | 1/2009 | Winstead |
| 2009/0013669 A1 | 1/2009 | Winstead |
| 2009/0013969 A1 | 1/2009 | Winstead |
| 2009/0018746 A1 | 1/2009 | Miller et al. |
| 2009/0030594 A1 | 1/2009 | You et al. |
| 2009/0042458 A1 | 2/2009 | Kinoshita |
| 2009/0042463 A1 | 2/2009 | Kinoshita |
| 2009/0118914 A1 | 5/2009 | Schwenke et al. |
| 2009/0118965 A1 | 5/2009 | Livshiz et al. |
| 2009/0118968 A1 | 5/2009 | Livshiz et al. |
| 2009/0118975 A1 | 5/2009 | Murakami et al. |
| 2009/0118986 A1 | 5/2009 | Kita |
| 2009/0177371 A1 | 7/2009 | Reinke |
| 2009/0204312 A1 | 8/2009 | Moriya |
| 2009/0229562 A1 | 9/2009 | Ramappan et al. |
| 2009/0241872 A1 | 10/2009 | Wang et al. |
| 2009/0248277 A1 | 10/2009 | Shinagawa et al. |
| 2009/0248278 A1 | 10/2009 | Nakasaka |
| 2009/0292435 A1 | 11/2009 | Costin et al. |
| 2010/0006065 A1 | 1/2010 | Tripathi et al. |
| 2010/0010724 A1 | 1/2010 | Tripathi et al. |
| 2010/0012072 A1 | 1/2010 | Leone et al. |
| 2010/0030447 A1 | 2/2010 | Smyth et al. |
| 2010/0036571 A1 | 2/2010 | Han et al. |
| 2010/0042308 A1 | 2/2010 | Kobayashi et al. |
| 2010/0050993 A1 | 3/2010 | Zhao et al. |
| 2010/0057283 A1 | 3/2010 | Worthing et al. |
| 2010/0059004 A1 | 3/2010 | Gill |
| 2010/0100299 A1 | 4/2010 | Tripathi et al. |
| 2010/0107630 A1 | 5/2010 | Hamama et al. |
| 2010/0211299 A1 | 8/2010 | Lewis et al. |
| 2010/0222989 A1 | 9/2010 | Nishimura |
| 2010/0236521 A1 | 9/2010 | Shiomi et al. |
| 2010/0282202 A1 | 11/2010 | Luken |
| 2010/0318275 A1 | 12/2010 | Borchsenius et al. |
| 2011/0005496 A1 | 1/2011 | Hiraya et al. |
| 2011/0030657 A1 | 2/2011 | Tripathi et al. |
| 2011/0048372 A1 | 3/2011 | Dibble et al. |
| 2011/0088661 A1 | 4/2011 | Sczomak et al. |
| 2011/0094475 A1 | 4/2011 | Riegel et al. |
| 2011/0107986 A1 | 5/2011 | Winstead |
| 2011/0118955 A1 | 5/2011 | Livshiz et al. |
| 2011/0144883 A1 | 6/2011 | Rollinger et al. |
| 2011/0178693 A1 | 7/2011 | Chang et al. |
| 2011/0208405 A1 | 8/2011 | Tripathi et al. |
| 2011/0213526 A1 | 9/2011 | Giles et al. |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2011/0264342 A1 | 10/2011 | Baur et al. |
| 2011/0265454 A1 | 11/2011 | Smith et al. |
| 2011/0265771 A1 | 11/2011 | Banker et al. |
| 2011/0295483 A1 | 12/2011 | Ma et al. |
| 2011/0313643 A1 | 12/2011 | Lucatello et al. |
| 2012/0029787 A1 | 2/2012 | Whitney et al. |
| 2012/0055444 A1 | 3/2012 | Tobergte et al. |
| 2012/0103312 A1 | 5/2012 | Sasai et al. |
| 2012/0109495 A1 | 5/2012 | Tripathi et al. |
| 2012/0116647 A1 | 5/2012 | Pochner et al. |
| 2012/0143471 A1 | 6/2012 | Tripathi et al. |
| 2012/0180759 A1 | 7/2012 | Whitney et al. |
| 2012/0221217 A1 | 8/2012 | Sujan et al. |
| 2012/0285161 A1 | 11/2012 | Kerns et al. |
| 2012/0310506 A1* | 12/2012 | McDonald .............. F02D 41/40 701/102 |
| 2013/0092127 A1 | 4/2013 | Pirjaberi et al. |
| 2013/0092128 A1 | 4/2013 | Pirjaberi et al. |
| 2013/0184949 A1 | 7/2013 | Saito et al. |
| 2013/0289853 A1 | 10/2013 | Serrano |
| 2013/0333663 A1 | 12/2013 | Chen et al. |
| 2013/0340709 A1 | 12/2013 | Panciroli |
| 2014/0041625 A1 | 2/2014 | Pirjaberi et al. |
| 2014/0041641 A1 | 2/2014 | Carlson et al. |
| 2014/0053802 A1 | 2/2014 | Rayl |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069375 A1* | 3/2014 | Matthews .............. F02D 41/0087 123/350 |
| 2014/0069376 A1 | 3/2014 | Matthews et al. |

(56) References Cited

U.S. PATENT DOCUMENTS

| | | | |
|---|---|---|---|
| 2014/0069377 A1* | 3/2014 | Brennan | F02D 41/0002 123/350 |
| 2014/0069378 A1 | 3/2014 | Burleigh et al. | |
| 2014/0069379 A1 | 3/2014 | Beikmann | |
| 2014/0069381 A1 | 3/2014 | Beikmann | |
| 2014/0076279 A1* | 3/2014 | Livshiz | F02D 13/0219 123/403 |
| 2014/0090623 A1 | 4/2014 | Beikmann | |
| 2014/0090624 A1 | 4/2014 | Verner | |
| 2014/0102411 A1 | 4/2014 | Brennan | |
| 2014/0190448 A1* | 7/2014 | Brennan | F02D 41/0062 123/350 |
| 2014/0190449 A1 | 7/2014 | Phillips | |
| 2014/0194247 A1 | 7/2014 | Burtch | |
| 2014/0207359 A1 | 7/2014 | Phillips | |
| 2014/0316681 A1* | 10/2014 | Whitney | F02D 41/22 701/108 |
| 2015/0240671 A1 | 8/2015 | Nakamura | |
| 2015/0260112 A1 | 9/2015 | Liu et al. | |
| 2015/0260117 A1 | 9/2015 | Shost et al. | |
| 2015/0354470 A1 | 12/2015 | Li et al. | |
| 2015/0361907 A1 | 12/2015 | Hayman et al. | |

FOREIGN PATENT DOCUMENTS

| | | |
|---|---|---|
| CN | 101220780 A | 7/2008 |
| CN | 101353992 A | 1/2009 |
| CN | 101476507 A | 7/2009 |
| CN | 101487424 A | 7/2009 |
| CN | 101586504 A | 11/2009 |
| CN | 102454493 A | 5/2012 |
| CN | 102806915 A | 12/2012 |
| CN | 103485906 A | 1/2014 |
| CN | 103670738 A | 3/2014 |
| CN | 103775225 A | 5/2014 |
| CN | 103939220 A | 7/2014 |
| CN | 104520563 A | 4/2015 |
| EP | 1460265 A1 | 9/2004 |
| EP | 1489595 A2 | 12/2004 |
| JP | S6397823 A | 4/1988 |
| JP | H0849577 A | 2/1996 |
| JP | 2003184590 A | 7/2003 |
| JP | 2003239747 A | 8/2003 |
| JP | 2004076677 A | 3/2004 |
| JP | 2004143969 A | 5/2004 |
| JP | 2005030295 A | 2/2005 |
| JP | 2010223019 A | 10/2010 |
| JP | 2011149352 | 8/2011 |
| JP | 2013133747 A | 7/2013 |

OTHER PUBLICATIONS

U.S. Appl. No. 13/798,351, filed Mar. 13, 2013, Rayl.
U.S. Appl. No. 13/798,384, filed Mar. 13, 2013, Burtch.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,737, filed Mar. 13, 2013, Beikmann.
U.S. Appl. No. 13/798,775, filed Mar. 13, 2013, Phillips.
U.S. Appl. No. 13/799,116, filed Mar. 13, 2013, Brennan.
U.S. Appl. No. 13/799,129, filed Mar. 13, 2013, Beikmann.
U.S. Appl. No. 13/799,181, filed Mar. 13, 2013, Beikmann.
U.S. Appl. No. 14/143,267, filed Dec. 30, 2013, Gehringer et al.
U.S. Appl. No. 14/211,389, filed Mar. 14, 2014, Liu et al.
U.S. Appl. No. 14/300,469, filed Jun. 10, 2014, Li et al.
U.S. Appl. No. 14/310,063, filed Jun. 20, 2014, Wagh et al.
U.S. Appl. No. 14/449,726, filed Aug. 1, 2014, Hayman et al.
U.S. Appl. No. 14/548,501, filed Nov. 20, 2014, Beikmann et al.
U.S. Appl. No. 61/952,737, filed Mar. 13, 2014, Shost et al.
Glossary of Judicial Claim Constructions in the Electronics, Computer and Business Method Arts. Public Patent Foundation. (2010).
First Office Action for Chinese Application No. 201610353948.4 dated Sep. 27, 2018; 9 pages.

* cited by examiner

AIR PER CYLINDER DETERMINATION SYSTEMS AND METHODS

FIELD

The present disclosure relates to internal combustion engines and more particularly to systems and methods for air state determination systems and methods for learning cylinder air per cylinder (APC)

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders generally increases the torque output of the engine.

Under some circumstances, one or more cylinders of an engine may be deactivated. Deactivation of a cylinder may include deactivating opening and closing of intake and exhaust valves of the cylinder and halting fueling of the cylinder. One or more cylinders may be deactivated, for example, to decrease fuel consumption when the engine can produce a requested amount of torque while the one or more cylinders are deactivated.

SUMMARY

In a feature, an engine control system of a vehicle is disclosed. A cylinder control module determines a target fraction of activated cylinders of an engine. A first air per cylinder (APC) module determines a first APC value based on an intake manifold pressure and an air temperature. An adjustment module determines an APC adjustment value based on the target fraction of activated cylinders. The first APC module determines a second APC value based on the first APC value and the APC adjustment value. A fuel control module controls fuel injection based on the second APC value and a target air/fuel mixture.

In further features, the adjusting module sets the second APC value based on one of a sum and a product of the first APC value and the APC adjustment value.

In further features, the adjustment module determines the APC adjustment value further based on the intake manifold pressure and an intake cam phaser position.

In further features, the adjustment module determines the APC adjustment value using a mapping that relates intake manifold pressures, intake cam phaser positions, and target fractions of activated cylinders to APC adjustment values.

In further features: a second APC module determines a third APC value based on a mass air flowrate (MAF) into the engine and the target fraction of activated cylinders; a filter module applies a filter to the third APC value to determine a fourth APC value; a learning module selectively adjusts a learn adjustment value based on a difference between the fourth APC value and the first APC value; and an adjusting module adjusts the second APC value based on the learn adjustment value to produce a fifth APC value. The fuel control module controls fuel injection based on the fifth APC value and the target air/fuel mixture.

In further features, an air state module sets an air state based on the target fraction of activated cylinders, wherein the learning module determines whether to adjust the learn adjustment value based on the air state.

In further features, the air state module transitions the air state from a first state to a second state when an intake air pressure ratio is less than a predetermined value, a change in the intake air pressure ratio is less than a second predetermined value, a change in the target fraction of activated cylinders is zero, a change in the fourth APC value is less than a third predetermined value, and a change in an intake cam phaser position is less than a fourth predetermined value. The learning module adjusts the learn adjustment value when the air state is in the second state.

In further features, the air state module transitions the air state from the second state to a third state when the change in the fourth APC value is less than a fifth predetermined value and the change in the intake cam phaser position is less than a sixth predetermined value, the learning module adjusts the learn adjustment value when the air state is in the third state.

In further features, the fifth predetermined value is less than the third predetermined value, and the sixth predetermined value is less than the fourth predetermined value.

In further features, the air state module transitions the air state from the third state to a fourth state when, for at least a predetermined period, the change in the fourth APC value is less than the fifth predetermined value and the change in the intake cam phaser position is less than the sixth predetermined value, and the learning module adjusts the learn adjustment value when the air state is in the third state.

In a feature, an engine control method for a vehicle is disclosed. An engine control method includes: determining a target fraction of activated cylinders of an engine; determining a first air per cylinder (APC) value based on an intake manifold pressure and an air temperature; determining an APC adjustment value based on the target fraction of activated cylinders; determining a second APC value based on the first APC value and the APC adjustment value; and controlling fuel injection based on the second APC value and a target air/fuel mixture.

In further features, the engine control method further includes setting the second APC value based on one of a sum and a product of the first APC value and the APC adjustment value.

In further features, the engine control method further includes determining the APC adjustment value further based on the intake manifold pressure and an intake cam phaser position.

In further features, the engine control method further includes determining the APC adjustment value using a mapping that relates intake manifold pressures, intake cam phaser positions, and target fractions of activated cylinders to APC adjustment values.

In further features, the engine control method further includes: determining a third APC value based on a mass air flowrate (MAF) into the engine and the target fraction of activated cylinders; applying a filter to the third APC value to determine a fourth APC value; selectively adjusting a learn adjustment value based on a difference between the fourth APC value and the first APC value; and adjusting the second APC value based on the learn adjustment value to produce a fifth APC value. Controlling the fuel injection comprises controlling the fuel injection based on the fifth APC value and the target air/fuel mixture.

In further features, the engine control method further includes: setting an air state based on the target fraction of activated cylinders; and determining whether to adjust the learn adjustment value based on the air state.

In further features, the engine control method further includes: transitioning the air state from a first state to a second state when an intake air pressure ratio is less than a predetermined value, a change in the intake air pressure ratio is less than a second predetermined value, a change in the target fraction of activated cylinders is zero, a change in the fourth APC value is less than a third predetermined value, and a change in an intake cam phaser position is less than a fourth predetermined value; and adjusting the learn adjustment value when the air state is in the second state.

In further features, the engine control method further includes: transitioning the air state from the second state to a third state when the change in the fourth APC value is less than a fifth predetermined value and the change in the intake cam phaser position is less than a sixth predetermined value; and adjusting the learn adjustment value when the air state is in the third state.

In further features, the fifth predetermined value is less than the third predetermined value, and the sixth predetermined value is less than the fourth predetermined value.

In further features, the engine control method further includes: transitioning the air state from the third state to a fourth state when, for at least a predetermined period, the change in the fourth APC value is less than the fifth predetermined value and the change in the intake cam phaser position is less than the sixth predetermined value; and adjusting the learn adjustment value when the air state is in the third state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines combust an air and fuel mixture within cylinders to generate torque. Under some circumstances, an engine control module (ECM) may deactivate one or more cylinders of the engine. The ECM may deactivate one or more cylinders, for example, to decrease fuel consumption.

The ECM determines a target firing fraction for the cylinders of the engine to achieve an engine torque request. A numerator of the target firing fraction may indicate how many cylinders to activate (Y) during the next X number of cylinders in a firing order of the cylinders, where X is the denominator of the target firing fraction. The ECM activates and deactivates cylinders to achieve the target firing fraction.

The ECM also determines first and second air per cylinder (APC) values. The ECM determines the first APC based on an intake manifold pressure, an air temperature, a volumetric efficiency of the engine, and a model calibrated based on the Ideal Gas Law. The ECM determines the second APC based on a mass air flowrate (MAF) measured using a MAF sensor. The ECM selectively learns the first APC toward the second APC when airflow into the engine is in steady-state. The second APC may be more accurate than the first APC during steady-state operation. The ECM may control fueling and/or one or more other engine operating parameters based on the first APC.

The target firing fraction could be varied on a cylinder-by-cylinder basis in an effort to achieve the engine torque request yet maximize the number of deactivated cylinders. Changing the target firing fraction, however, changes airflow into the engine and may limit the period of time spent in steady-state operation. Therefore, the period of learning of the first APC toward the second APC may also be limited.

As discussed further below, for example in conjunction with FIGS. 3-5, the ECM of the present application learns the first APC toward the second APC during operation in a learning enabled state, a steady-state pending state, and steady-state. Predetermined conditions for operation in the learning enabled state and the steady-state pending state are less strict than predetermined conditions for operating in steady-state. This may allow the ECM to learn the first APC toward the second APC for greater periods of time and more frequently. The learning performed during the learning enabled state and the steady-state pending state may be performed more slowly than learning performed during steady-state operation to minimize improper learning and over-learning.

Deactivating one or more cylinders of the engine changes the volumetric efficiency of the engine. As such, the ECM also determines an adjustment for the first APC based on the target firing fraction. The ECM adjusts the first APC based on the adjustment to increase the accuracy of the first APC.

Figure 1:
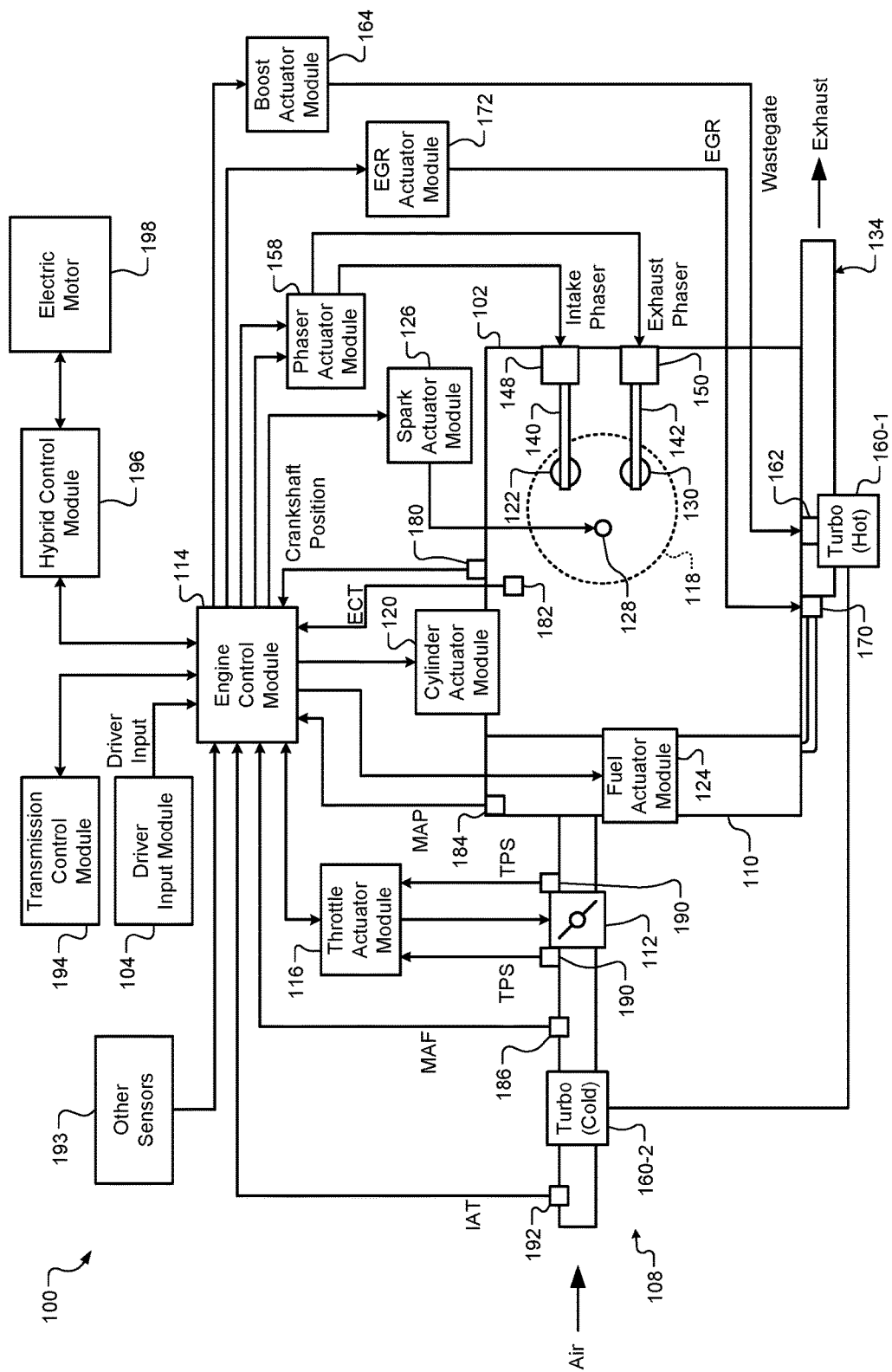
FIG. 1 is a functional block diagram of an example engine system.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184.

In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194, for example, to coordinate shifting gears in a transmission. For example, the ECM 114 may reduce engine torque during a gear shift. The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may control the actuator values in order to cause the engine 102 to generate a requested engine output torque.

Figure 2:
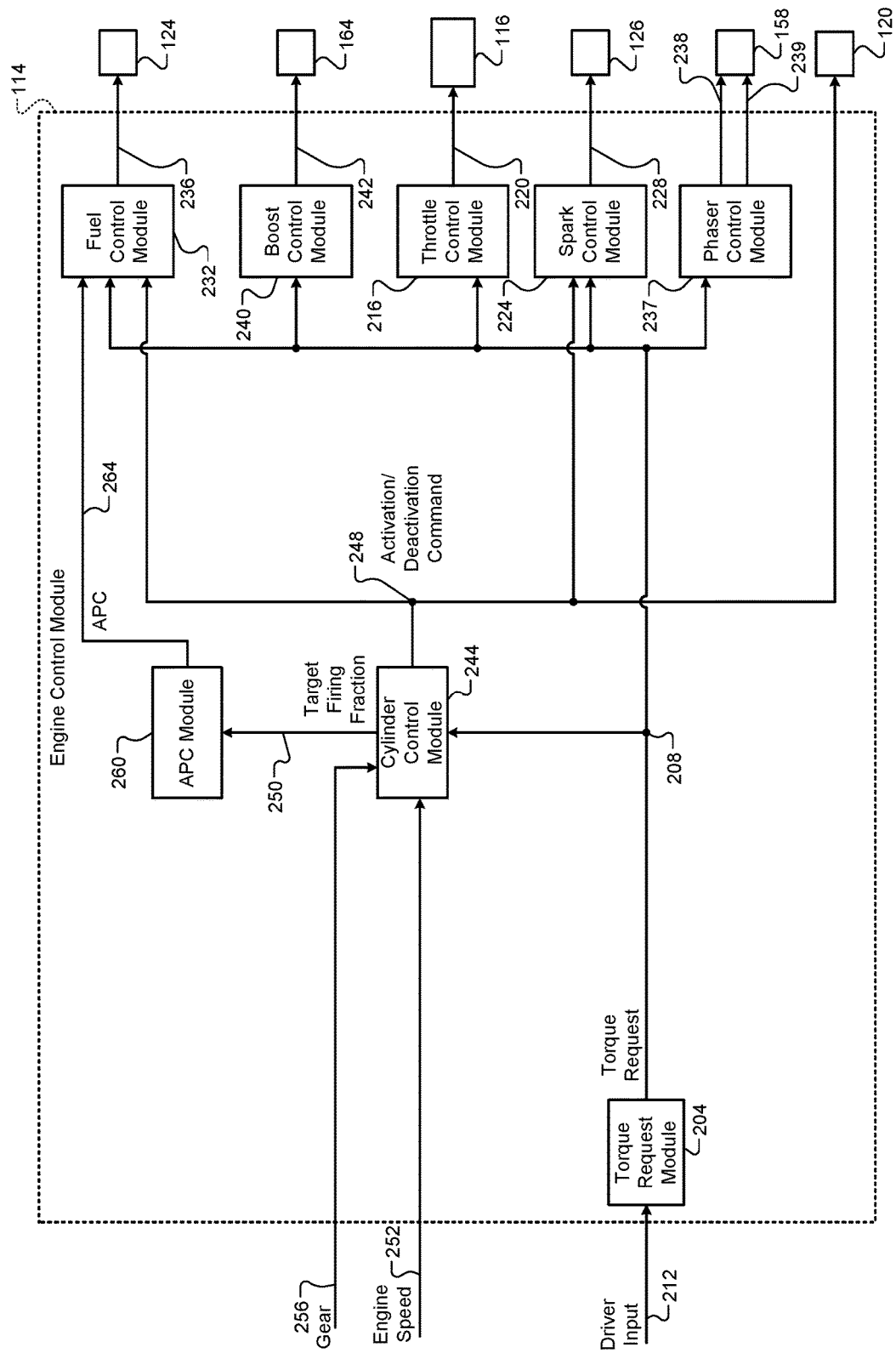
FIG. 2 is a functional block diagram of an example engine control system.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 determines a target spark timing 228 based on the torque request 208. The spark actuator module 126 generates spark based on the target spark timing 228. A fuel control module 232 determines one or more target fueling parameters 236 based on the torque request 208. For example, the target fueling parameters 236 may include fuel injection amount, number of fuel injections for injecting the amount, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively. A boost control module 240 may determine a target boost 242 based on the torque request 208. The boost actuator module 164 may control boost output by the boost device(s) based on the target boost 242.

A cylinder control module 244 generates an activation/deactivation command 248 for a next cylinder in a predetermined firing order of the cylinders ("the next cylinder"). The activation/deactivation command 248 indicates whether the next cylinder should be activated or deactivated. For example only, the cylinder control module 244 may set the activation/deactivation command 248 to a first state (e.g., 1) when the next cylinder should be activated and set the activation/deactivation command 248 to a second state (e.g., 0) when the next cylinder should be deactivated. While the activation/deactivation command 248 is and will be discussed as being generated for the next cylinder in the predetermined firing order, the activation/deactivation command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 deactivates the intake and exhaust valves of the next cylinder when the activation/deactivation command 248 indicates that the next cylinder should be deactivated. The cylinder actuator module 120 allows opening and closing of the intake and exhaust valves of the next cylinder when the activation/deactivation command 248 indicates that the next cylinder should be activated.

The fuel control module 232 halts fueling of the next cylinder when the activation/deactivation command 248 indicates that the next cylinder should be deactivated. The fuel control module 232 sets the target fueling parameters 236 to provide fuel to the next cylinder when the activation/deactivation command 248 indicates that the next cylinder should be activated. The spark control module 224 may provide spark to the next cylinder when the activation/deactivation command 248 indicates that the next cylinder should be activated. The spark control module 224 may provide or halt spark to the next cylinder when the activation/deactivation command 248 indicates that the next cylinder should be deactivated. Cylinder deactivation is different than fuel cutoff (e.g., deceleration fuel cutoff) in that the intake and exhaust valves of cylinders to which fueling is halted during fuel cutoff may still be opened and closed during fuel cutoff whereas the intake and exhaust valves of cylinders are maintained closed when those cylinders are deactivated.

The cylinder control module 244 may generate the activation/deactivation command 248 based on a target firing fraction 250. A numerator of the target firing fraction 250 corresponds to a target number of cylinders to be activated (M) out of the next N cylinders in the predetermined firing order of the cylinders, and N is the denominator of the target firing fraction. For example, a target firing fraction of 5/8 indicates that 5 of the next 8 cylinders in the predetermined firing order should be activated. In this example, 3 of the next 8 cylinders in the predetermined firing order should therefore be deactivated. A target firing fraction of 0 corresponds to all of the cylinders of the engine 102 being deactivated (and 0 being activated), and a target firing fraction of 1 corresponds to all of the cylinders of the engine 102 being activated (and 0 being deactivated).

The cylinder control module 244 may determine the target firing fraction 250 based on the torque request 208, an engine speed 252, and a current gear ratio 256 of the transmission. For example, the cylinder control module 244 may determine the target firing fraction 250 using one of a function and a mapping that relates torque requests, engine speeds, and gear ratios to target firing fractions. The engine speed 252 may be determined, for example, based on crankshaft position measured using the crankshaft position sensor 180. The transmission control module 194 controls which gear ratio is engaged within the transmission and may provide the current gear ratio 256.

An air per cylinder (APC) module 260 determines an APC 264 for the next cylinder in the predetermined firing order. The APC 264 may correspond to a predicted amount (e.g., mass) of air that will be trapped within the next cylinder in the predetermined firing order. Fueling and/or one or more other engine operating parameters may be set based on the APC 264. For example, when the next cylinder in the predetermined firing order is to be activated, the fuel control module 232 may determine the mass of fuel to inject for the next cylinder based on achieving a target (e.g., stoichiometric) air/fuel mixture given the APC 264.

Figure 3:
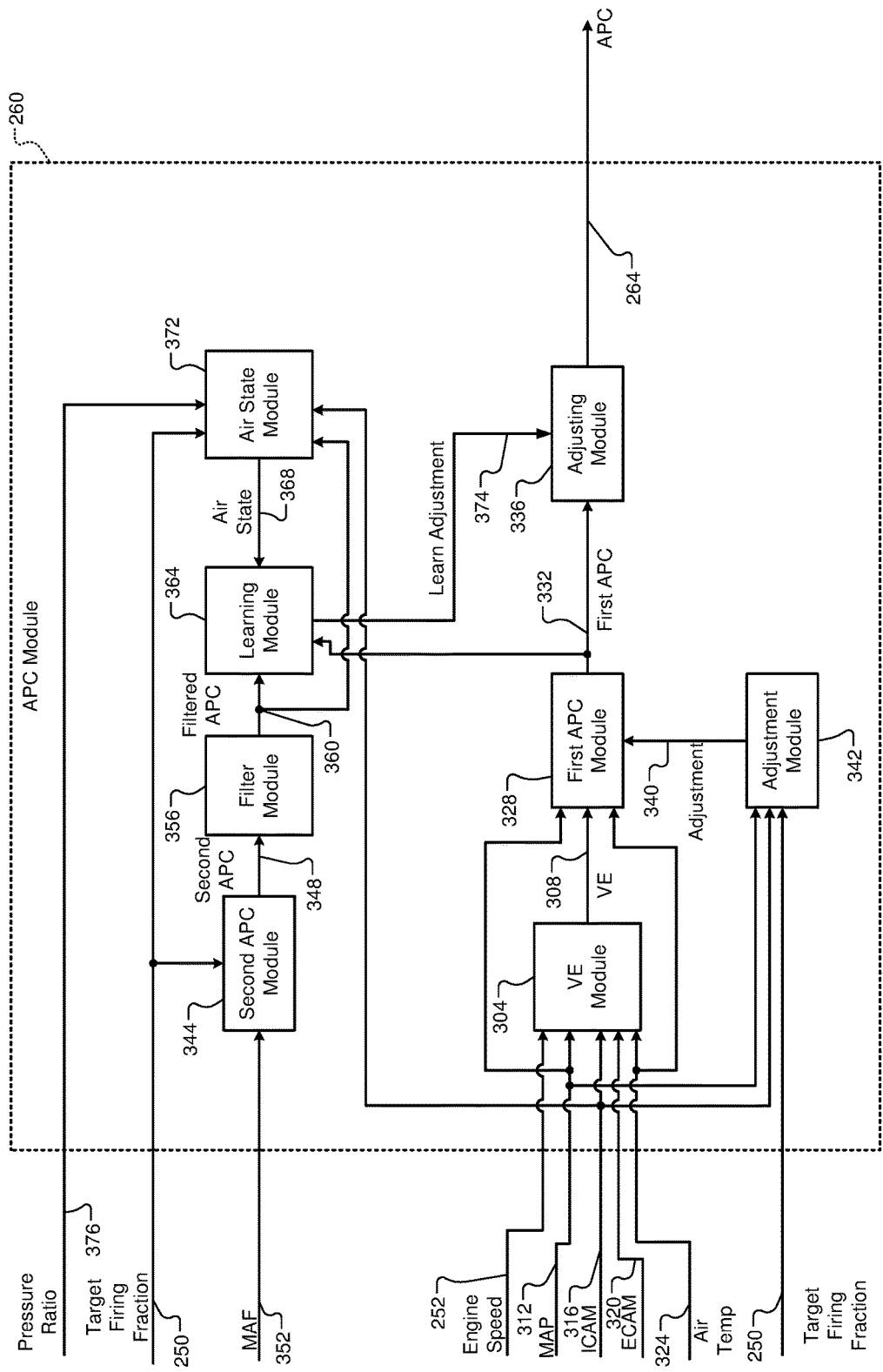
FIG. 3 is a functional block diagram of an air per cylinder (APC) module.

FIG. 3 includes a functional block diagram of an example implementation of the APC module 260. Referring now to FIG. 3, a volumetric efficiency (VE) module 304 determines a volumetric efficiency (VE) 308 for the next cylinder in the predetermined firing order.

The volumetric efficiency module 304 determines the VE 308 based on the engine speed 252, a MAP 312, an intake cam phaser position (ICAM) 316, and an exhaust cam phaser position (ECAM) 320. The volumetric efficiency module 304 may determine the VE 308 further based on an air temperature 324. For example, the volumetric efficiency module 304 may determine the VE 308 using one or more functions or mappings that relate engine speeds, MAPs, ICAMs, ECAMs, and air temperatures to volumetric efficiencies. The MAP 312 may be measured using the MAP sensor 184. The ICAM 316 and the ECAM 320 may be measured using intake and exhaust cam phaser position sensors, respectively. The air temperature 324 may be measured, for example, using the IAT sensor 192.

A first APC module 328 determines a first APC 332 based on the VE 308, the air temperature 324, and the MAP 312. The first APC 332 may correspond to a predicted amount (e.g., mass) of air that will be trapped within the next cylinder in the predetermined firing order. The first APC module 328 determines the first APC 332 using one or more functions and/or mappings that relates VEs, air temperatures, and MAPs to first APCs.

For example, the first APC module 328 may determine an initial APC based on the air temperature 324, the MAP 312, the predetermined volume of the cylinders, and the Ideal Gas Law. The initial APC may be determined based on the relationship $$APC\ \text{Initial} = VE * \frac{V * P}{R * T}$$

where APC Initial is the initial APC, V is the predetermined volume of the cylinders, P is the MAP 312, R is the Ideal Gas Constant, T is the air temperature 324, and VE is the volumetric efficiency 308. This relationship may be embodied as a mapping.

The first APC module 328 may determine the first APC 332 based on an APC adjustment value 340 and the initial APC. For example, the first APC module 328 may set the first APC 332 based on or using the relationship:

APC 1=Adj*APC Initial, where APC 1 is the first APC 332, Adj is the APC adjustment value 340, and APC Initial is the initial APC.

When one or more cylinders of the engine 102 are deactivated, the engine 102 may have a higher volumetric efficiency than when all of the cylinders are activated. To account for this, an adjustment module 342 determines the APC adjustment 340 based on the target firing fraction 250, the MAP 312, the ICAM 316, the ECAM 320, and the engine speed 252. The adjustment module 342 may determine the APC adjustment 340, for example, using a function or a mapping that relates target firing fractions, MAPs, ICAMs, ECAMs, and engine speeds to APC adjustments.

The adjusting module 336 adjusts the first APC 332 based on a learn adjustment 374 to produce the APC 264. For example only, the adjusting module 336 may set the APC 264 equal to or based on a sum or a product of the learn adjustment 374 and the first APC 332. One or more engine actuators may be controlled based on the APC 264. For example, as stated above, fueling of the next cylinder in the predetermined firing order may be set to achieve a target air/fuel mixture given the APC 264.

The APC module 260 also includes a second APC module 344. The second APC module 344 determines a second APC 348 based on a MAF 352 measured using the MAF sensor 186. Like the first APC 332, the second APC 348 may correspond to a predicted amount (e.g., mass) of air that will be trapped within the next cylinder in the predetermined firing order.

Being based on the MAF 352, the second APC 348 may be more accurate than the first APC 332 under some circumstances, such as during steady-state and near steady-state operation. The second APC module 344 may determine the second APC 348, for example, by mathematically integrating the MAF 352 (e.g., in g/s of air) to determine a mass (e.g., in grams) of air and dividing the mass by the number of activated cylinders of the engine 102. The second APC module 344 may determine the number of activated cylinders, for example, from the target firing fraction 250.

A filter module 356 filters the second APC 348 to produce a filtered APC 360. For example only, the filter module 356 may apply a low pass filter or a first-order lag filter to the second APC 348 to produce the filtered APC 360.

A learning module 364 performs learning to adjust the first APC 332 toward the filtered APC 360 at times when the second APC 348 may be more accurate than the first APC 332. More specifically, the learning module 364 performs learning when an air state 368 is in a steady-state (SS) state, a SS pending state, or a learning enabled state. The learning module 364 disables learning when the air state 368 is in a transient state. The learning is discussed in more detail below.

An air state module 372 sets the air state 368 based on an intake air pressure ratio 376, the target firing fraction 250, the filtered APC 360, and the intake cam phaser position (ICAM) 316. When the target firing fraction 250 is less than 1, indicating that less than all of the cylinders are to be activated, the air state module 372 sets the air state 368 at a given time to: the transient state, the learning enabled state, the SS pending state, or the SS state. The intake air pressure ratio 376 may correspond to a ratio of ambient pressure to pressure within the intake manifold 110. The intake air pressure ratio 376 may also be referred to as a pressure ratio across the throttle valve 112 and may be determined based on a ratio of a throttle inlet air pressure (TIAP) and the MAP 312.

Figure 4:
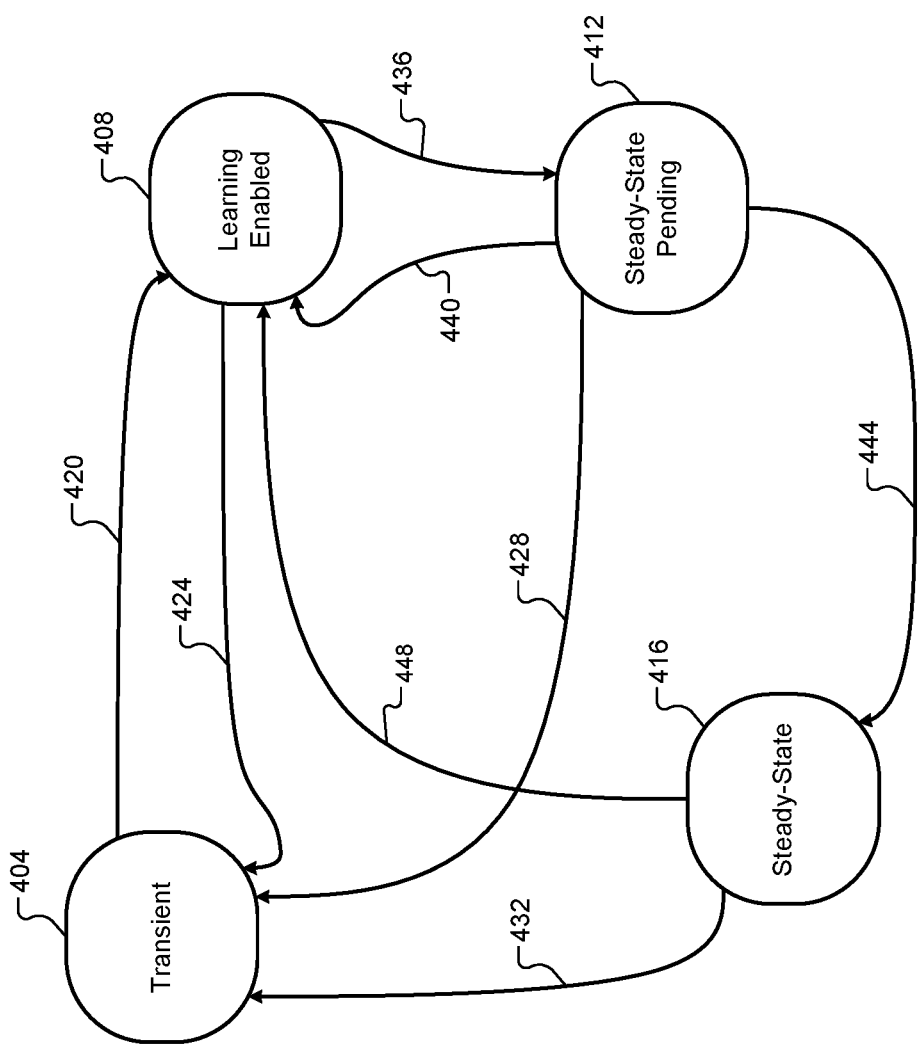
FIG. 4 is an example state diagram for air states.

FIG. 4 includes an example state diagram for the air state 368. 404 represents the air state 368 being set to the transient state, and 408 represents the air state 368 being set to the learning enabled state. 412 represents the air state 368 being set to the SS pending state, and 416 represents the air state 368 being set to the SS state.

Referring now to FIGS. 3 and 4, the air state module 372 sets the air state 368 to the transient state by default. The air state module 372 transitions the air state 368 from the transient state to the learning enabled state when:

(1) the intake air pressure ratio 376 is less than a first predetermined value;

(2) a change in the target firing fraction 250 is zero;

(3) a change in the intake air pressure ratio 376 is less than a predetermined value;

(4) a change in the filtered APC 360 is less than a first predetermined APC change; and (5) a change in the ICAM 316 is less than a first predetermined position change.

In FIG. 4, this transition is indicated by 420. The change in the intake air pressure ratio 376 may be determined based on a difference between the intake air pressure ratio 376 and the value of the intake air pressure ratio 376 from a predetermined number of engine cycles earlier. The predetermined number of engine cycles may be, for example, two. The change in the target firing fraction 250 may be determined based on a difference between the target firing fraction 250 and the value of the target firing fraction 250 from the predetermined number of engine cycles earlier. The change in the filtered APC 360 may be determined based on a difference between the filtered APC 360 and the value of the filtered APC 360 from the predetermined number of engine cycles earlier. The change in the ICAM 316 may be determined based on a difference between the ICAM 316 and the value of the ICAM 316 from the predetermined number of engine cycles earlier.

The air state module 372 transitions the air state 368 from the learning enabled state to the transient state when one or more of (6)-(10) are satisfied:

(6) the intake air pressure ratio 376 is greater than a second predetermined value;

(7) the target firing fraction 250 has changed from its last value;

(8) the change in the intake air pressure ratio 376 is greater than the predetermined value;

(9) the change in the filtered APC 360 is greater than the first predetermined APC change; and

(10) the change in the ICAM 316 is greater than the first predetermined position change.

This transition is indicated by 424 in FIG. 4. The second predetermined value may be greater than or equal to the first predetermined value. In general, the air state module 372 may transition the air state 368 to the transient state from the SS state or the SS pending state when one or more of (6)-(10) are satisfied. These transitions are indicated by 428 and 432 in FIG. 4.

The air state module 372 transitions the air state 368 from the learning enabled state to the SS pending state when:

(11) the change in the filtered APC 360 is less than a second predetermined APC change; and

(12) the change in the ICAM 316 is less than a second predetermined position change.

In FIG. 4, this transition is indicated by 436. The second predetermined APC change is less than the first predetermined APC change, and the second predetermined position change is less than the first predetermined position change. As such, the filtered APC 360 and the ICAM 316 are allowed to change to a lesser extent for a transition from the learning enabled state to the SS pending state than for a transition from the transient state to the learning enabled state. The air state module 372 may transition the air state 368 from the SS pending state to the learning enabled state when at least one of (11) and (12) is not satisfied. This transition is indicated by 440 in FIG. 4. Transitioning back to the transient state, however, may take priority when one or more of (6)-(10) are satisfied.

The air state module 372 transitions the air state 368 from the SS pending state to the SS state when (11) and (12) have been met (and therefore the air state 368 has been in the SS pending state) for a predetermined number of combustion events or a predetermined amount of crankshaft rotation. For example only, the predetermined number of cylinder events may be 3 in the example of an 8 cylinder, four-stroke engine, where the predetermined amount of crankshaft rotation is 270 crankshaft angle degrees. Another suitable number of cylinder events and/or amount of crankshaft rotation may be used. This transition is indicated by 444 in FIG. 4. The air state module 372 may transition the air state 368 from the SS state to the learning enabled state when at least one of (11) and (12) is not satisfied. This transition is indicated by 448 in FIG. 4. Transitioning back to the transient state, however, may take priority when one or more of (6)-(10) are satisfied.

As stated above, the learning module 364 performs learning when the air state 368 is in the learning enabled state, the SS pending state, or the SS state. The learning module 364 disables learning when the air state 368 is in the transient state. The learning module 364 learns to adjust the first APC 332 toward the filtered APC 360. For example, the learning module 364 may determine a difference between the first APC 332 and the filtered APC 360 and determine the learn adjustment 374 based on the difference.

When the air state 368 is in the learning enabled state, the learning module 364 may incrementally adjust the learn adjustment 374 to adjust the first APC 332 toward the filtered APC 360 at a first predetermined rate. In other words, the learning module 364 may incrementally adjust (increase or decrease) the learn adjustment 374 by up to a first predetermined amount each time that the APC 264, the first APC 332, the second APC 348, and the filtered APC 360 are updated.

When the air state 368 is in the SS pending state, the learning module 364 may incrementally adjust the learn adjustment 374 to adjust the first APC 332 toward the filtered APC 360 at a second predetermined rate that is greater than the first predetermined rate. In other words, the learning module 364 may incrementally adjust (increase or decrease) the learn adjustment 374 by up to a second predetermined amount each time that the APC 264, the first APC 332, the second APC 348, and the filtered APC 360 are updated. The second predetermined amount is greater than the first predetermined amount.

When the air state 368 is in the SS state, the learning module 364 may incrementally adjust the learn adjustment 374 to adjust the first APC 332 toward the filtered APC 360 at a third predetermined rate that is greater than the second predetermined rate. In other words, the learning module 364 may incrementally adjust (increase or decrease) the learn adjustment 374 by up to a third predetermined amount each time that the APC 264, the first APC 332, the second APC 348, and the filtered APC 360 are updated. The third predetermined amount is greater than the second predetermined amount. In various implementations, when the air state 368 is in the SS state, the learning module 364 may simply update the learn adjustment 374 for the VE 308 based on the difference such that the first APC 332 will be set equal to the filtered APC 360 the next time that the same operating conditions are encountered.

Figure 5:
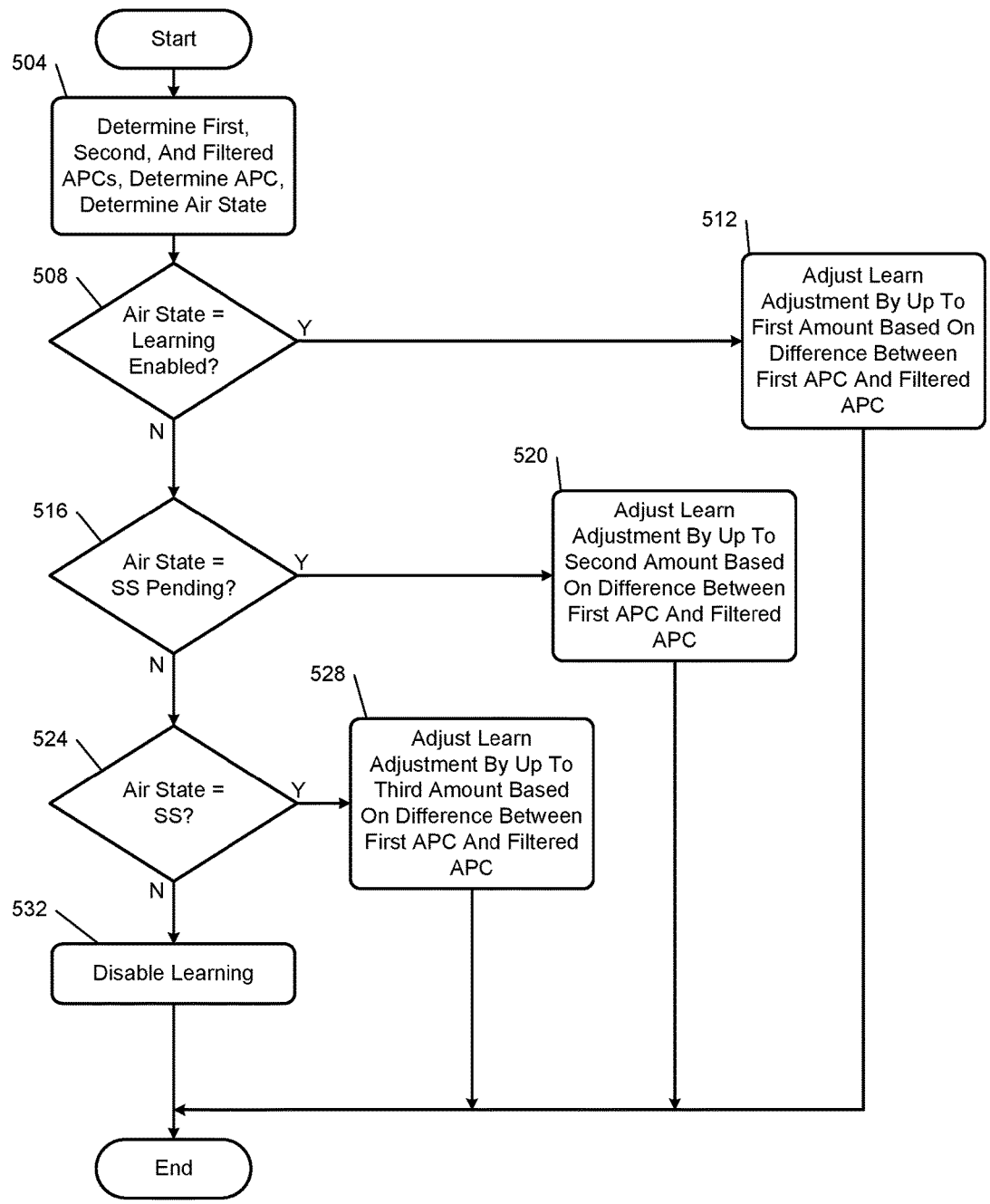
FIG. 5 is a flowchart depicting an example method for learning values for determining an APC value when one or more cylinders of the engine are deactivated.

FIG. 5 is a flowchart depicting an example method for learning for determining the first APC 332 when one or more cylinders of the engine 102 are deactivated. Control may begin with 504 where the first APC module 328 determines the first APC 332, the adjusting module 336 adjusts the first APC 332 to determine the APC 264, the second APC module 344 determines the second APC 348, and the filter module 356 determines the filtered APC 360. The air state module 372 also determines the air state 368 to one of: the transient state, the learning enabled state, the SS pending state, and the SS state at 504.

At 508, the learning module 364 determines whether the air state 368 is set to the learning enabled state. If 508 is true, control continues with 512. If 508 is false, control continues with 516, which is discussed below. At 512, the learning module 364 determines a difference between the first APC 332 and the filtered APC 360 and adjusts (increases or decreases) the learn adjustment 374 by up to the first predetermined amount based on the difference. Based on the adjustment, the first APC 332 should be closer to the filtered APC 360 in the future.

At 516, the learning module 364 determines whether the air state 368 is set to the SS pending state. If 516 is true, control continues with 520. If 516 is false, control continues with 524, which is discussed below. At 520, the learning module 364 determines a difference between the first APC 332 and the filtered APC 360 and adjusts (increases or decreases) the learn adjustment 374 by up to the second predetermined amount based on the difference. Based on the adjustment, the first APC 332 should be closer to the filtered APC 360 in the future.

At 524, the learning module 364 determines whether the air state 368 is set to the SS state. If 524 is true, control continues with 528. If 524 is false, the air state 368 is set to the transient state, so the learning module 364 disables learning at 532, and control ends. The learning module 364 may leave the learn adjustment 374 unchanged when learning is disabled. At 528, the learning module 364 determines a difference between the first APC 332 and the filtered APC 360 and adjusts (increases or decreases) the learn adjustment 374 by up to the third predetermined amount based on the difference. Based on the adjustment, the first APC 332 should be closer to the filtered APC 360 in the future.

The third predetermined amount may be greater than the second predetermined amount such that a larger adjustment may be made during the SS state than in the SS pending state. The second predetermined amount may be greater than the first predetermined amount such that a larger adjustment may be made during the SS pending state than in the learning enabled state. While the example of FIG. 5 is shown as ending after 512, 520, 528, or 532, FIG. 5 is illustrative of one control loop and control loops are initiated at a predetermined rate, such as once every predetermined amount of crankshaft rotation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An engine control system of a vehicle, comprising:
a cylinder control module that determines a target fraction of activated cylinders of an engine;
a first air per cylinder (APC) module that determines a first APC value based on an intake manifold pressure and an air temperature;
an adjustment module that determines an APC adjustment value based on the target fraction of activated cylinders;
wherein the first APC module determines a second APC value based on the first APC value and the APC adjustment value;
a second APC module that determines a third APC value based on a mass air flowrate (MAF) into the engine and the target fraction of activated cylinders;
a filter module that applies a filter to the third APC value to determine a fourth APC value;
an air state module that transitions an air state from a first state to a second state when an intake air pressure ratio is less than a predetermined value, a change in the intake air pressure ratio is less than a second predetermined value, a change in the target fraction of activated cylinders is zero, a change in the fourth APC value is less than a third predetermined value, and a change in an intake cam phaser position is less than a fourth predetermined value;
a learning module that adjusts a learn adjustment value at a first predetermined rate when the air state is in the second state and that does not adjust the learn adjustment value when the air state is in the first state;
an adjusting module that adjusts the second APC value based on the learn adjustment value to produce a fifth APC value; and
a fuel control module controls fuel injection based on the fifth APC value and a target air/fuel mixture.

2. The engine control system of claim 1 wherein the first APC module sets the second APC value based on one of a sum and a product of the first APC value and the APC adjustment value.

3. The engine control system of claim 1 wherein the adjustment module determines the APC adjustment value further based on the intake manifold pressure and an intake cam phaser position.

4. The engine control system of claim 3 wherein the adjustment module determines the APC adjustment value using a mapping that relates intake manifold pressures, intake cam phaser positions, and target fractions of activated cylinders to APC adjustment values.

5. The engine control system of claim 1 wherein the air state module transitions the air state from the second state to a third state when the change in the fourth APC value is less than a fifth predetermined value and the change in the intake cam phaser position is less than a sixth predetermined value, and
wherein the learning module adjusts the learn adjustment value at a second predetermined rate that is greater than the first predetermined rate when the air state is in the third state.

6. The engine control system of claim 5 wherein the fifth predetermined value is less than the third predetermined value, and
wherein the sixth predetermined value is less than the fourth predetermined value.

7. The engine control system of claim 5 wherein the air state module transitions the air state from the third state to a fourth state when, for at least a predetermined period, the change in the fourth APC value is less than the fifth predetermined value and the change in the intake cam phaser position is less than the sixth predetermined value,
wherein the learning module adjusts the learn adjustment value at a third predetermined rate that is greater than the second predetermined rate when the air state is in the fourth state.

8. An engine control method for a vehicle, comprising:
determining a target fraction of activated cylinders of an engine;
determining a first air per cylinder (APC) value based on an intake manifold pressure and an air temperature;
determining an APC adjustment value based on the target fraction of activated cylinders;
determining a second APC value based on the first APC value and the APC adjustment value;

determining a third APC value based on a mass air flowrate (MAF) into the engine and the target fraction of activated cylinders;

applying a filter to the third APC value to determine a fourth APC value;

transitioning an air state from a first state to a second state when an intake air pressure ratio is less than a predetermined value, a change in the intake air pressure ratio is less than a second predetermined value, a change in the target fraction of activated cylinders is zero, a change in the fourth APC value is less than a third predetermined value, and a change in an intake cam phaser position is less than a fourth predetermined value, adjusting a learn adjustment value at a first predetermined rate when the air state is in the second state;

not adjusting the learn adjustment value when the air state is in the first state;

adjusting the second APC value based on the learn adjustment value to produce a fifth APC value; and controlling fuel injection based on the fifth APC value and a target air/fuel mixture.

9. The engine control method of claim 8 wherein determining the second APC value includes setting the second APC value based on one of a sum and a product of the first APC value and the APC adjustment value.

10. The engine control method of claim 8 further comprising determining the APC adjustment value further based on the intake manifold pressure and an intake cam phaser position.

11. The engine control method of claim 10 further comprising determining the APC adjustment value using a mapping that relates intake manifold pressures, intake cam phaser positions, and target fractions of activated cylinders to APC adjustment values.

12. The engine control method of claim 8 further comprising:

transitioning the air state from the second state to a third state when the change in the fourth APC value is less than a fifth predetermined value and the change in the intake cam phaser position is less than a sixth predetermined value; and adjusting the learn adjustment value at a second predetermined rate that is greater than the first predetermined rate when the air state is in the third state.

13. The engine control method of claim 12 wherein the fifth predetermined value is less than the third predetermined value, and wherein the sixth predetermined value is less than the fourth predetermined value.

14. The engine control method of claim 12 further comprising:

transitioning the air state from the third state to a fourth state when, for at least a predetermined period, the change in the fourth APC value is less than the fifth predetermined value and the change in the intake cam phaser position is less than the sixth predetermined value; and adjusting the learn adjustment value at a third predetermined rate that is greater than the second predetermined rate when the air state is in the fourth-state.

* * * * *